(12) United States Patent
Van Der Geer et al.

(10) Patent No.: US 10,887,166 B2
(45) Date of Patent: Jan. 5, 2021

(54) MESH NETWORK NODE

(71) Applicant: SIGNIFY HOLDING B.V., Eindhoven (NL)

(72) Inventors: Paul Van Der Geer, Eindhoven (NL); Paulus Thomas Arnoldus Thijssen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 132 days.

(21) Appl. No.: 15/754,341

(22) PCT Filed: Jul. 21, 2016

(86) PCT No.: PCT/EP2016/067375
§ 371 (c)(1),
(2) Date: Feb. 22, 2018

(87) PCT Pub. No.: WO2017/032517
PCT Pub. Date: Mar. 2, 2017

(65) Prior Publication Data
US 2018/0278474 A1 Sep. 27, 2018

(30) Foreign Application Priority Data
Aug. 27, 2015 (EP) .................................... 15182711

(51) Int. Cl.
*H04L 12/24* (2006.01)
*H04W 40/12* (2009.01)
(Continued)

(52) U.S. Cl.
CPC .... *H04L 41/0816* (2013.01); *H04L 29/08351* (2013.01); *H04L 45/127* (2013.01);
(Continued)

(58) Field of Classification Search
CPC ... H04L 29/08396–08441; H04L 41/12; H04L 45/02; H04L 67/1061–1072;
(Continued)

(56) References Cited

U.S. PATENT DOCUMENTS 7,903,558 B1 * 3/2011 Dropps ................... H04L 47/26
370/232
8,532,003 B2 9/2013 Pandey et al.
(Continued)

FOREIGN PATENT DOCUMENTS

CN 104853485 A 8/2015
JP 2010252225 A 11/2010
(Continued)

OTHER PUBLICATIONS

S. Safaric and K. Malaric, "ZigBee wireless standard," Proceedings ELMAR 2006, Zadar, 2006, pp. 259-262.*
(Continued)

*Primary Examiner* — Brendan Y Higa
(74) *Attorney, Agent, or Firm* — Daniel J. Piotrowski

(57) ABSTRACT

Proposed is a network node (102) for a mesh network (100). The network node comprises a processing unit (202) adapted to determine an indicator of reliability of the network node. The network node also comprise a control unit (220) adapted to configure the network node to operate in either a router configuration or an end-node configuration based on the determined indicator of reliability of the network node. The network node may thus adapt its configuration based on its reliability.

18 Claims, 3 Drawing Sheets

(51) Int. Cl.
*H04W 40/20* (2009.01)
*H04W 40/24* (2009.01)
*H04W 40/34* (2009.01)
*H04W 84/18* (2009.01)
*H04L 12/721* (2013.01)
*H04L 29/08* (2006.01)
*H04W 84/14* (2009.01)

(52) U.S. Cl.
CPC ......... *H04L 67/1051* (2013.01); *H04W 40/12* (2013.01); *H04W 40/20* (2013.01); *H04W 40/248* (2013.01); *H04W 40/34* (2013.01); *H04W 84/18* (2013.01); *Y02D 30/70* (2020.08)

(58) Field of Classification Search
CPC ... H04L 29/08306–08387; H04L 41/08–0816; H04L 45/127; H04L 67/104–1072; H04W 40/24–248
See application file for complete search history.

(56) References Cited

U.S. PATENT DOCUMENTS

| | | | | |
|---|---|---|---|---|
| 2005/0037789 | A1* | 2/2005 | Rhee | H04W 40/246 |
| | | | | 455/507 |
| 2006/0264214 | A1* | 11/2006 | Stanwood | H04W 84/20 |
| | | | | 455/433 |
| 2006/0285579 | A1* | 12/2006 | Rhee | H04W 84/18 |
| | | | | 375/132 |
| 2007/0045424 | A1* | 3/2007 | Wang | H04W 40/246 |
| | | | | 235/462.46 |
| 2007/0132846 | A1* | 6/2007 | Broad | G08B 29/188 |
| | | | | 348/143 |
| 2007/0153707 | A1* | 7/2007 | Thubert | H04L 45/025 |
| | | | | 370/254 |
| 2010/0085903 | A1 | 4/2010 | Pandey et al. | |
| 2011/0063999 | A1 | 3/2011 | Erdmann et al. | |
| 2012/0134395 | A1 | 5/2012 | Varadarajan et al. | |
| 2012/0158820 | A1* | 6/2012 | Bai | G07C 5/008 |
| | | | | 709/202 |
| 2012/0320768 | A1* | 12/2012 | Shaffer | H04W 40/16 |
| | | | | 370/252 |
| 2013/0183900 | A1 | 7/2013 | Lee et al. | |
| 2014/0314058 | A1* | 10/2014 | Hughes | H04W 84/12 |
| | | | | 370/338 |
| 2016/0164831 | A1* | 6/2016 | Kim | H04L 65/102 |
| | | | | 709/223 |
| 2017/0093663 | A1* | 3/2017 | Douglas | H04L 41/12 |

FOREIGN PATENT DOCUMENTS

JP 2014042093 A 3/2014
WO 2014152104 A1 9/2014

OTHER PUBLICATIONS

Thomas Kubtitze, X"bee ZigBee How to", Dec. 13, 2012, Gadgeteer@HCI-Lab.

* cited by examiner

MESH NETWORK NODE

CROSS-REFERENCE TO PRIOR APPLICATIONS

This application is the U.S. National Phase application under 35 U.S.C. § 371 of International Application No. PCT/EP2016/067375, filed on JUL. 21, 2016 which claims the benefit of European Patent Application No. 15182711.0, filed on AUG. 27, 2015. These applications are hereby incorporated by reference herein.

FIELD OF THE INVENTION

This invention relates to the field of mesh networks and in particular to mesh networks comprising a plurality of nodes.

BACKGROUND OF THE INVENTION

There has been an increasing trend in the use of mesh networks in home automation systems, secured military applications and other peer-to-peer connectivity systems.

A mesh network is typically understood to be an interconnected series of nodes, wherein each node contributes to the provision of information and/or signals across other nodes. In other words, there may be more than one communication path between a pair of nodes in the mesh network. This allows a mesh network to have a degree of redundancy, such that, for example, if a single node becomes inactive, the remaining nodes may still communicate with one another.

Typically, each node in a mesh network operates on a single communication channel, so as to permit ease of communication between nodes of the mesh network. A node may comprise, for example, a wireless-connectable device capable of operating on a given wireless communication channel. Examples of such nodes may comprise a ZigBee (®) router or a BlueTooth-enabled relay.

A mesh network node may be arranged in a router ("RT") configuration or in an end-node (EN) configuration. A node in a RT configuration will typically transmit data captured, measured, or disseminated from the node itself and/or transmit other data received from at least one other node. Unlike a node in a RT configuration, a node in an EN configuration only transmits data captured, measured, or disseminated from the node itself In other words, a node in a RT configuration may act as a router for receiving data from one network node and passing/routing data on to another network node, whereas a node in an EN configuration cannot pass or route data from one network node to another network node.

By way of example, a node in a RT configuration may be arranged in communication with a network base station and adapted to transmit data to a node in an EN configuration. Thus, nodes in the RT configuration may allow a mesh network to have nodes in communication with the network base station but outside a signal range of the network base station.

SUMMARY OF THE INVENTION

The invention is defined by the claims.

According to a first aspect of the inventive concept there is provided a network node for a mesh network comprising: a processing unit adapted to determine an indicator of reliability of the network node; and a control unit adapted to configure the network node to operate in either a router configuration or an end-node configuration based on the determined indicator of reliability of the network node.

Thus, proposed is a network node device which is adapted to determine an indication of its reliability and to operate in either a RT configuration or an EN configuration based on the indicator of reliability. A network node device according to an embodiment may therefore be able to determine whether or not it is reliable and switch its configuration in order to ensure reliable communication.

By way of example, a network node according to an embodiment may determine a measure or indication of its reliability using one or more factors that may influence, or being indicative of, accessibility of the network node to a network. For example, a network node that is frequently switched off (e.g. experiences a high power cycle frequency) may be unreliable due to it being regularly powered down and unable to communicate with a network. Similarly, a network node that is mobile and regularly moved or positioned beyond an operating range of a wireless network may be considered unreliable due to its signal strength or quality having a high degree of variability.

Thus, in some embodiments, the processing unit may be adapted to determine the indicator of reliability of the network node based on at least one of: a measure of availability of the network node; a determined location of the network node; a measure of signal strength or quality at the network node; update information from the network; a frequency or number of power cycles experienced by the network node; a signal from another network node; a number of other nodes in the network; and a user input signal received via a user input interface.

Such information useful for determining an indication of reliability may be provided to a network node, from an external sensor or device for example. Alternatively, or additionally, a network node according to an embodiment may be adapted to obtain (e.g. sense, detect, discover, etc.) information that may be useful for determining its reliability. Embodiments may therefore comprise one or more sensor units adapted to determine at least one of: a measure of availability of the network node; a determined location of the network node; a measure of strength or quality at the network node; and a frequency or number of power cycles experienced by the network node.

The control unit may be adapted to configure the network node to operate in the end-node configuration if the indicator of reliability of the network node is below a predetermined acceptable level. Thus, if the reliability of the network node is deemed to be insufficient (e.g. too low) to meet predetermined requirements, the network node may be configured to operate as an end-node. In this way, a required level of communication reliability in the network may be maintained and/or assured.

Embodiments may be further adapted to communicate a device announcement signal to at least one other network node in response to the control unit changing the configuration that the network node operates in. For instance, embodiments may be adapted to issue a 'device announce' signal when switching from RT configuration to EN configuration, or vice versa.

The control unit may be further adapted to periodically reconfigure the network node between the router configuration and the end-node configuration. For example, after a predetermined length of time, the network node may be reconfigured from the end-node configuration to the router configuration. This may enable a node to generate an updated indictor of reliability and/or to announce or indicate its potential operation as a router device to nodes of the network. The predetermined length of time may depend on the dynamics of the network, for example, due to various operational demands. For instance, in a network having a low number or rate of messages, the predetermined length of time may be measured in days. Conversely, for a network having a high number or rate of messages, the predetermined length of time may be measured in seconds, minutes or hours.

Embodiments may advantageously allow a mesh network to freely adjust its configuration, as a node may automatically re-configure its operating mode between a router mode and an end-node mode. This may allow for improvements in communication reliability as communication to one or mode network nodes may be maintained when a network node becomes unavailable for instance. Also, this may advantageously increase the chances that messages transmitted by a network base station will be successfully communicated to a particular network node. It may also improve the power efficiency of a network node by controlling to the node to only operate in the router configuration (which consumers more power than the end-node configuration) when the reliability of the node is sufficient (e.g. meets or exceed a predetermined minimum reliability level).

Embodiments may be employed in a mesh network for example. Thus, there may be provided a mesh network comprising: a network node according to an embodiment; and a network base station adapted to communicate with the network node via a communication channel. Also, in at least one embodiment, the mesh network may be a wireless network operating in accordance with the ZigBee(R) standard, and the network node may be is a ZigBee(R) network device.

According to another aspect of the invention, there is provided a method of controlling a network node for a mesh network comprising: determining, in the network node, an indicator of reliability of the network node; and configuring the network node to operate in either a router configuration or an end-node configuration based on the determined indicator of reliability of the network node.

The step of determining an indicator of reliability of the network node may comprise determining the indicator of reliability of the network node based on at least one of: a measure of availability of the network node; a determined location of the network node; a measure of signal strength or quality at the network node; a frequency or number of power cycles experienced by the network node; update information from the network; and a user input signal received via a user input interface.

The step of determining the indicator of reliability of the network node may further comprise using one or more sensor units of the network node to determine at least one of: a measure of availability of the network node; a determined location of the network node; a measure of strength or quality at the network node; and a frequency or number of power cycles experienced by the network node.

The step of configuring the network node may comprise configuring the network node to operate in the end-node configuration if the indicator of reliability of the network node is below a predetermined acceptable level.

The method may further comprise communicating a device announcement signal from the network node to at least one other network node in response to changing the configuration that the network node operates in.

The method may further comprise periodically reconfiguring the network node between the router configuration and the end-node configuration.

According to another aspect of the inventive concept, there is provided a computer program product comprising computer program code means adapted to perform all of the steps of a method according to an embodiment when said program is run on a computing device having a processor.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

There is proposed the concept of controlling a network node device to operate in either a RT configuration or an EN configuration based on its reliability. For example, a proposed network node may determine whether or not it is reliable based on its accessibility to a network and then control its configuration to operate as either a router or an end-node in an attempt to ensure reliable communications within the network.

A proposed network node device may therefore operate as a router or end-node depending on its perceived or established reliability within the network.

Figure 1:
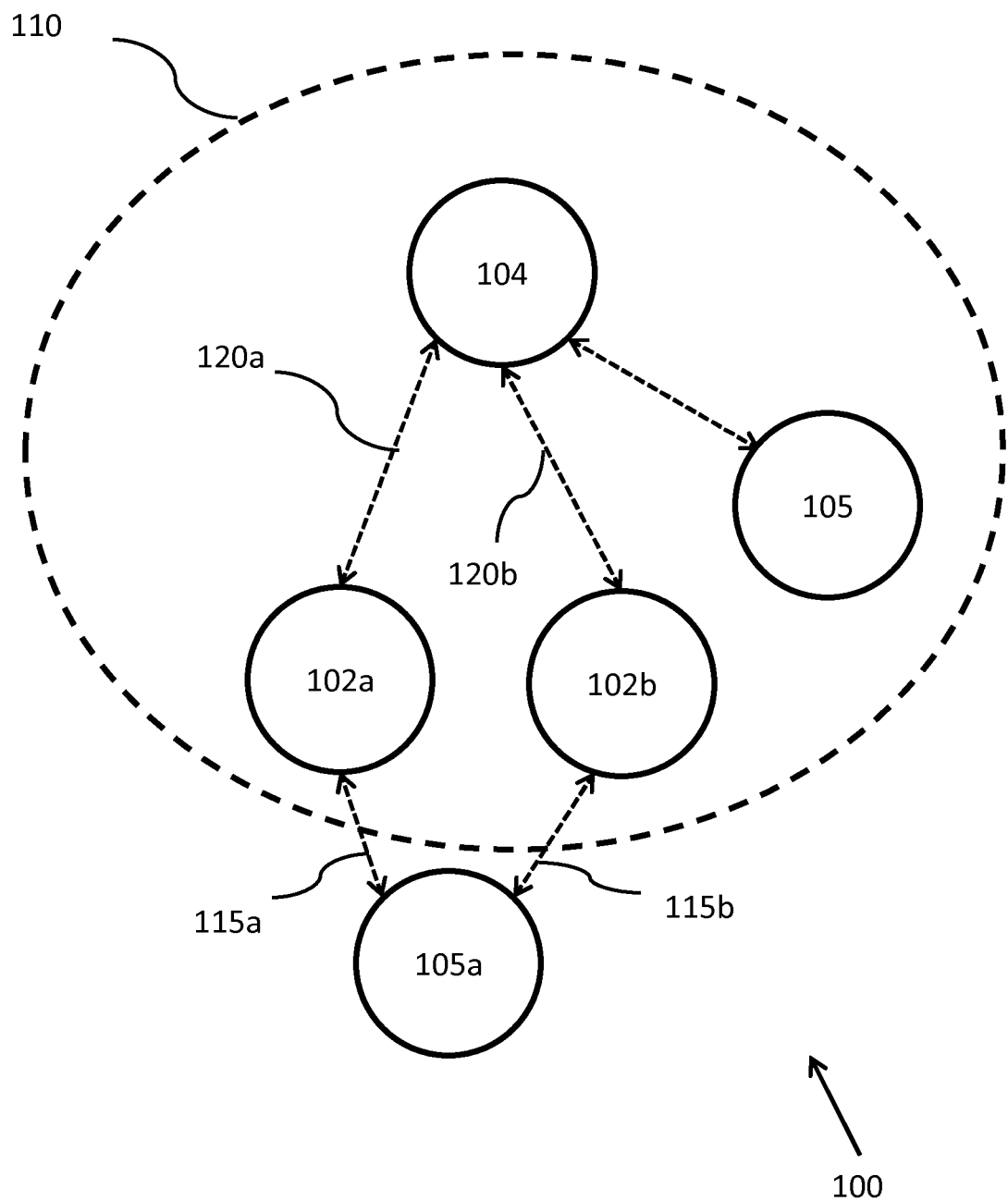
FIG. 1 illustrates a schematic diagram of a mesh network according to an embodiment.

FIG. 1 is a schematic diagram of a mesh network 100 according to an embodiment. The mesh network 100 comprises: network nodes 102 according to an embodiment; and a network base station 104 adapted to communicate with the network nodes via one or more communication channels. The network base station 104 is equipped for two-way or bidirectional communication (e.g., Ethernet, ZigBee, Bluetooth, Wi-Fi, or the like) with the nodes 102. The mesh network 100 also comprises end node ("EN") devices 105. The EN Devices 105 are permanently configured in an EN configuration.

The network nodes 102, on the other hand, are adapted operate in either a router ("RT") configuration or an EN configuration based on an internally generated indication of its reliability. Nodes 102 in the RT configuration allow the mesh network 100 to have an EN device 105 in two-way communication with the network base station 104 even when situated outside a signal range 110 of the network base station 104 (as is the case for first EN device 105a in FIG. 1). This is done by having the nodes 102 form communication links. For example, a first EN device 105a may have two-way communications with the network base station 104 by way of a two-stage communication link comprising a first communication link 115a with a first node 102a and a second communication link 120a between the first node 102a and the network base station 104. Further, the first EN device 105a may also have two-way communications with the network base station 104 by way of a two-stage communication from a first-stage communication link 115b with the second node 102*b* and then a second-stage communication link 120*b* between the second node 102*b* and the network base station 104.

Thus, when in an RT configuration, the first 102*a* and second nodes 102*b* allow the exemplary system 100 to have a first EN device 105*a* outside a signal range 110 of the network base station 104.

Figure 2:
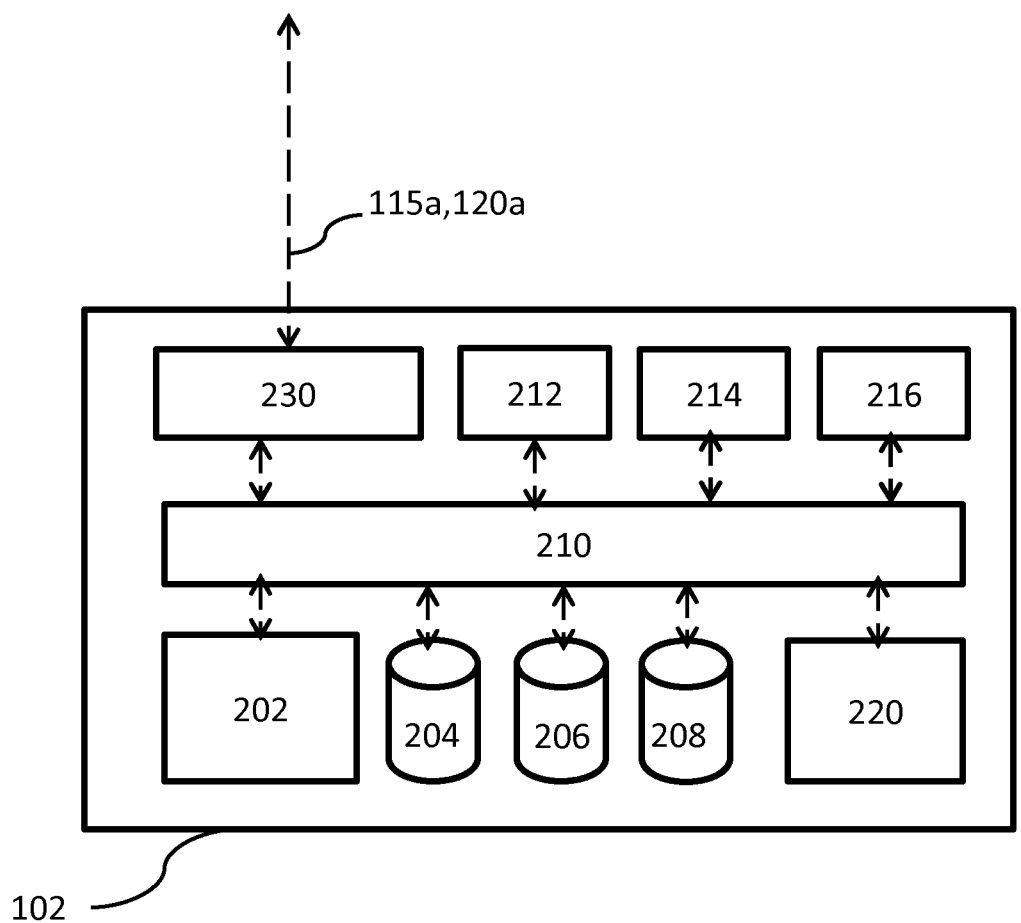
FIG. 2 shows a diagrammatic representation of a computing device in the example form of a network node according to an embodiment.

FIG. 2 shows a diagrammatic representation of a computing device in the example form of a network node 102 within which a set of instructions, for causing the network node to perform any one or more of the methodologies discussed herein, may be executed. In alternative embodiments, the network node operates as a standalone device or may be connected (e.g., networked) to other device or machines. In a networked deployment, the node 102 may operate in the capacity of a server or a client machine in client-server network environment, or as a peer machine in a peer-to-peer (or distributed) network environment, such as a mesh network. The node 102 may be a computer, an intelligent sensor, a logic device, an application specific integrated circuit (ASIC), a field programmable gate array (FPGA), a process logic controller (PLC), a hard-wired module, a network router, gateway, switch or bridge, or any machine capable of executing a set of instructions (sequential or otherwise) that specify actions to be taken by that machine. Further, while a single device is illustrated in FIG. 2, the term "device" or "node" should also be understood to include any collection of machines or devices that individually or jointly execute a set (or multiple sets) of instructions to perform any one or more of the methodologies or concepts discussed herein.

The example node 102 of FIG. 2 includes a processor 202 (e.g., a central processing unit (CPU)), a main memory 204 and optionally a static memory 206 and a non-volatile memory 208, which communicate with each other via a bus 210. The node 200 further includes first to third sensor devices 212, 214, and 216. These sensor devices can include location sensors (e.g. a GPS receiver unit), signal strength sensor, user input sensor and/or other types of sensors for detecting and measuring a desired parameter. The node 200 also comprises a control signal generation unit 220 and a network interface device 230 (e.g., a radio transceiver).

The non-volatile memory 208 includes a machine-readable medium in which is stored one or more sets of instructions (e.g., software) embodying any one or more of the method or functions described herein. The instructions may also reside, completely or partially, within the main memory 204, the static memory 206, and/or within the processor 202 during execution thereof by the node 200. Also, the main memory 204, static memory 206, and the processor 202 may constitute machine-readable media. The software, instructions, and/or related data 220 may be transmitted or received over a network communication link 115*a* or 120*a* via the network interface device 230. The network interface device 230, in a wireless node configuration of one embodiment, may include a radio transceiver for sending and receiving data via the network communication link 115*a*,120*a* using a wireless data transfer protocol, such as the family of 802.11 standards from IEEE. In this manner, node 200 can perform wireless data communications with other nodes of the mesh network 100.

The control signal generation unit 220 can be used to control the operation of the node 200 so as to configure the node to operate in either a RT configuration or an EN configuration. By way of example, the control signal generation unit 220 of this embodiment controls the operation of the node 200 based on an indication of reliability of the network node that it receives from the processor 202 via the bus 210. The processor 202 of FIG. 2 is thus adapted to generate an indicator of reliability of the network node 102.

By way of example, the processor 202 may be adapted to determine a reliability of the node 102 using signals from the first to third sensor devices 212, 214, and 216 which may be indicative of accessibility of the network node to a network. For example, the first sensor device 212 may be adapted to determine a location of the node 102 using signals from a GPS satellite, and the determined location may indicate that the node 102 is moved or positioned beyond an operating range 110 of the network base station 104. Further, a second sensor device 214 may be adapted to sense signal strength or quality. In addition to using signals from the sensor devices 212, 214, 216, the processor may receive information useful for generating an indicator of reliability from an external sensor or device, via the network interface device 230 for example.

Thus, using appropriate signals and information, the processor 202 may generate an indicator of reliability (e.g. a numerical measure, a score, or alphanumeric description) of the network node 102 and then supply the indicator of reliability to the control signal generation unit 220 (via the bus 210).

Based on the received indicator of reliability, the control signal generation unit 220 may generate a control signal for configuring the network node 102 to operate in either the RT configuration or EN configuration. For example, if the indicator of reliability of the network node 102 is below a predetermined acceptable threshold level, the control signal generation unit 220 may generate a control signal for configuring the node 102 to operate in the EN configuration. Put another way, if the reliability of the network node 102 is indicated to be insufficient (e.g. too low) to meet predetermined requirements, the control signal generation unit 220 may be used to configure the network node 102 to operate as an end-node. In this way, a required level of communication reliability in the network may be maintained and/or assured.

Conversely, if the indicator of reliability of the network node 102 is above a predetermined acceptable threshold level, the control signal generation unit 220 may generate a control signal for configuring the node 102 to operate in the RT configuration. In other words, if the reliability of the network node 102 is indicated to be sufficient (e.g. good enough) to meet predetermined requirements, the control signal generation unit 220 may be used to configure the network node 102 to operate as a router. In this way, a required level of communication reliability in the network may be maintained and/or assured.

It will therefore be understood that the node 102 is adapted to switch between the first and second modes of operation, and the switching between the first and second modes may be done based on an indication or measure of reliability that is determined by the network node 102. The processor 202 of the node 102 may also be adapted to communicate a device announcement signal (via the network interface device 230) to at least one other network node of the mesh network 100 in response to changing the configuration that the network node 102 operates in. For instance, it may be preferable in embodiments to issue a 'device announce' signal when the node 120 switches from the RT configuration to the EN configuration, or vice versa.

Further, in the depicted embodiment of FIG. 2, when in the EN configuration, the control signal generation unit 220 may periodically generate a signal for reconfiguring the network node back to the RT configuration. For example, after a predetermined length of time in the EN configuration, the control signal generation unit 220 may generate a control signal for reconfiguring the node 102 from the EN configuration to the RT configuration. This may enable the node 102 to announce or indicate its potential operation as a router device to nodes of the network 100 for instance.

It will be appreciated that embodiment of FIG. 2 may advantageously allow a mesh network (such as that depicted in FIG. 1) to adjust its configuration, as a node 102 may automatically re-configure its operating mode between a RT configuration and an EN configuration.

For example, referring back to the mesh network 100 of FIG. 1, the network base station 104 may comprise a network bridge located in a first room of a building, the first 102*a* and second nodes 102*b* may comprise a first and second luminaires located in second and third rooms of the building, respectively, and the EN device 105*a* may comprise a presence sensor located in a fourth room of the building. As a result of their respective locations, the first 102*a* and second nodes 102*b* may be situated within the signal range 110 of the network base station 104, whereas the EN device 105*a* may be situated beyond (e.g. outside) the signal range 110 of the network base station 104.

In such an example, the distance between the network base station 104 and the EN device 105*a* is too large for a direct connection between the network base station 104 and the EN device 105*a* to be established. Therefore, the EN device 105*a* uses either the first node 102*a* or second node 102*b* as a parent so that the first 102*a* or second node 102*b* routes communications between the network base station 104 and the EN device 105*a*.

However, in this example, the power of the first 102*a* and second nodes 102*b* (i.e. first 102*a* and second 102*b* luminaires) is controlled by first and second wall switches, respectively, which may make the reliability of the first 102*a* and second nodes 102*b* poor, because they can be easily and/or regularly switched off for example. The frequency of power cycles (e.g. switching) experienced by the first 102*a* and second nodes 102*b* may be used to determine their respective reliability since. For example, a node which is regularly switched off (e.g. a node with a high power cycle/switching frequency) may be determined to have a low/poor reliability, due it regularly being made unavailable to the network for instance. Conversely, a node which is rarely or infrequently switched off (e.g. a node with a low power cycle/switching frequency) may be determined to have a high/good reliability, due it only being made unavailable to the network on an infrequent or irregular basis for instance. Based on this insight, an indicator of reliability for a network node may therefore be based on a frequency or number of power cycles it experiences.

Considering now the above example, if the first node 102*a* determines that it is regularly switched off, it may determine that it is of low/poor reliability and to configure itself to operate in an end-node configuration. In this way, reliance on the first node 102*a* to operate as a parent device so that it routes communications between the network base station 104 and the EN device 105*a* may be avoided. This may allow for improvements in communication reliability as communication to the EN device 105*a* may be maintained (via the more reliable second node 102*b*) when the first network node 102*a* becomes unavailable for instance. Also, this may advantageously increase the chances that messages transmitted by the network base station 104 will be successfully communicated to the EN device 105*a*.

It will, however, be understood, that other factors which may influence, or being indicative of, accessibility of a network node to a network may also be used to determine an indicator of network node reliability, either along in combination. For example, a network node that is regularly moved or positioned beyond an operating range of the network may be considered unreliable due to its signal strength or quality having a high degree of variability.

Embodiments may be used to particular advantage for a wireless mesh network operating on a ZigBee(®) communication protocol, otherwise named a ZigBee network.

A skilled person would readily understand there to be three logical device types defined in the ZigBee standard: a ZigBee end device, a ZigBee coordinator and a ZigBee router. A ZigBee end device is adapted to communicate with only a single other device. A ZigBee coordinator is able to create a centralized security network (i.e. is the originator or base station of the ZigBee network). A ZigBee router is adapted to communicate with a plurality of other devices and route messages from and to these devices. A network node according to an embodiment may therefore be adapted to operate as either a ZigBee router or a ZigBee end device based on an indicator of reliability of the network node.

A skilled person may therefore understand that a mesh network device according to an embodiment may act, in accordance with the ZigBee communication standard, as both a ZigBee router and a ZigBee end device. In one embodiment, the device can autonomously make such a decision, e.g. upon receiving first update data from the mesh network (e.g. ZigBee network).

Suitable wireless communication protocols that may be used in the communicate with the mesh network bridging device, the power harvesting device and the mesh network include an infrared link, ZigBee, Bluetooth, a wireless local area network protocol such as in accordance with the IEEE 802.11 standards, a 2G, 3G or 4G telecommunication protocol, and so on. Other formats will be readily apparent to the person skilled in the art.

Figure 3:
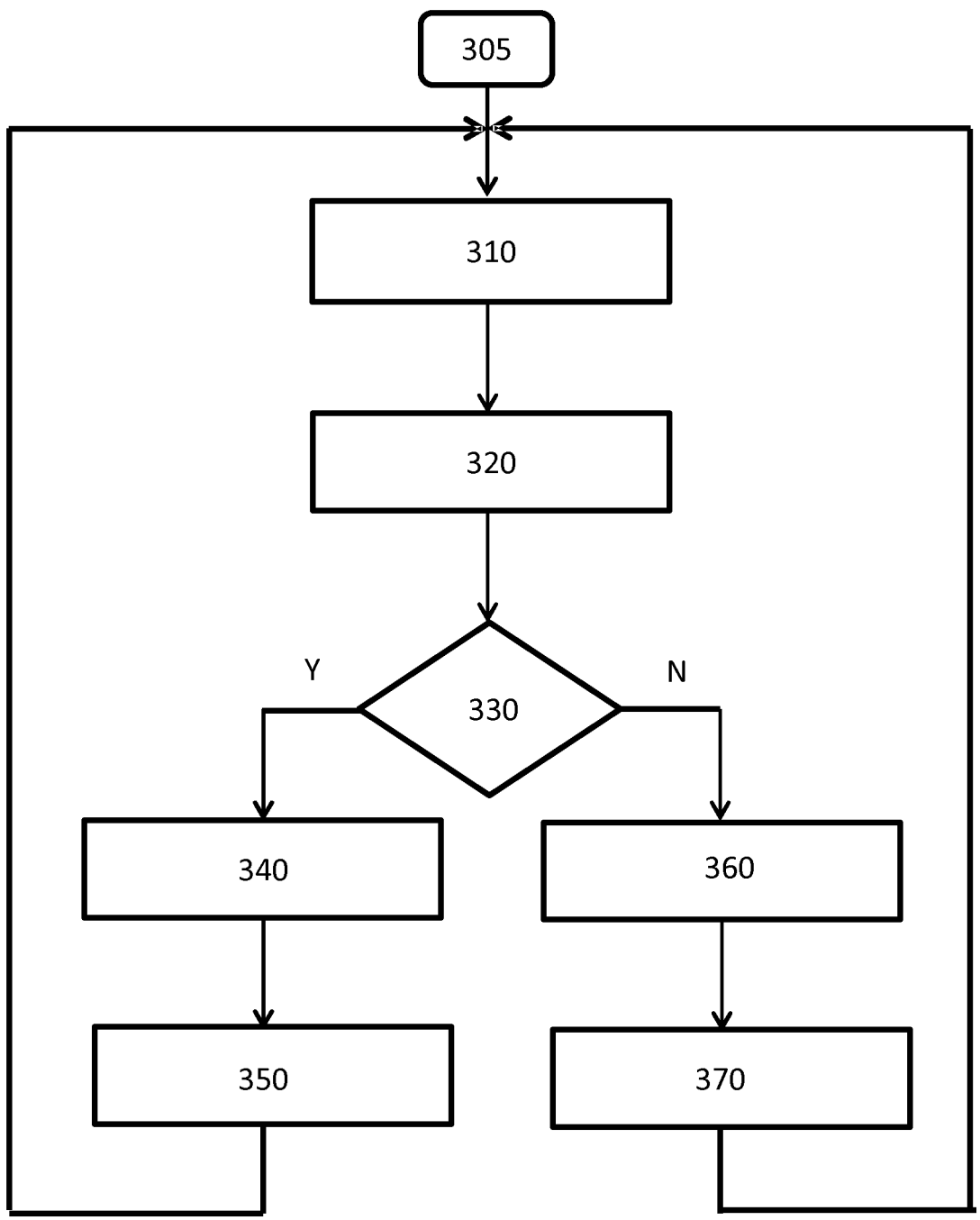
FIG. 3 depicts a flowchart of a method of controlling a network node for a mesh network according to an embodiment.

An embodiment of a method 300 for controlling a network node for a mesh network will be readily understood with reference to FIG. 3. The method 300 begins in step 305 after which it progresses to the step 310 of obtaining information for use in determining a reliability of the network node. Here, the information may comprises at least one of: a measure of availability of the network node; a determined location of the network node; a measure of signal strength or quality at the network node; a frequency or number of power cycles experienced by the network node; update information from the network; and a user input signal received via a user input interface. Thus, it will be understood that the step 310 of obtaining such information may comprising sensing information and/or signals using one or more sensors. The sensors may be provided by (e.g. integrated with) the network node or alternatively (or additionally) provided by external devices (which are adapted to communicate information to the network node).

Next, in step 320, the network node uses the obtained information to generate an indicator of reliability of the network node. For example, in this embodiment, the indicator of may comprise a numerical value that is representative of at least one of: a measure of availability of the network node; a determined location of the network node; a measure of strength or quality at the network node; and a frequency or number of power cycles experienced by the network node.

The method then proceeds step 330 in which the indicator of reliability is compared against a threshold value to determine if it is above or below the threshold value.

If, in step 330, it is determined that the indicator of reliability is above the threshold value, the method proceeds to step 340. In step 340, the network node generates a control signal for configuring the node to operate in the RT configuration. Subsequently, in step 350 the control signal is used to configure the node to operate in the RT configuration. In other words, if the reliability of the network node is indicated to be sufficient to meet predetermined requirements (e.g. by exceeding the threshold), the network node is configured to operate as a router.

If, in step 330, it is determined that the indicator of reliability is below the threshold value, the method proceeds to step 360. In step 360, the network node generates a control signal for configuring the node to operate in the EN configuration. Subsequently, in step 370 the control signal is used to configure the node to operate in the EN configuration. Put another way, if the reliability of the network node is indicated to be insufficient to meet predetermined requirements (e.g. by not exceeding the threshold), the network node is configured to operate as an end-node.

After being configured to operate in either the RT or EN configuration (in step 350 or 370), the method returns to step 310 once again. In this way, the method can be repeated so as to repeatedly obtain an updated indicator of reliability of the network node and configure the network node in response. In this way, a required level of communication reliability in the network may be maintained and/or assured.

In at least one embodiment, there is provided a computer program product comprising computer program code means adapted to perform all of the steps of the method as described with reference to FIG. 3 when said program is run on a computing device having a processor.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A network node for a mesh network, the network node comprising:
   one or more sensors adapted to determine a frequency or number of power cycles experienced by the network node;
   a processor adapted to receive information pertaining to the determined frequency or number of power cycles experienced by the network node;
   wherein the processor determines an indicator of reliability of the network node using said information; and
   a control unit, implemented in hardware, adapted to configure the network node to operate in either a router configuration or an end-node configuration based on the determined indicator of reliability of the network node.

2. The network node of claim 1, wherein the control unit is adapted to configure the network node to operate in the end-node configuration if the indicator of reliability of the network node is below a predetermined level.

3. The network node of claim 1, wherein the control unit is further adapted to communicate a device announcement signal to at least one other network node in response to the control unit changing the configuration that the network node operates in.

4. The network node of claim 1, wherein the control unit is further adapted to periodically reconfigure the network node between the router configuration and the end-node configuration.

5. A mesh network comprising:
   a network node according to claim 1; and
   a network base station adapted to communicate with the network node via a communication channel.

6. The mesh network of claim 5, wherein:
   the mesh network is a wireless network operating in accordance with the ZigBee (RTM) standard.

7. The network node of claim 1, wherein said hardware is selected from a group consisting of: a computer, an intelligent sensor, a logic device, an application specific integrated circuit (ASIC), a field programmable gate array (FPGA), a process logic controller (PLC), a hard-wired module, a network router, gateway, switch or bridge, and any machine capable of executing a set of instructions (sequential or otherwise) that specify actions to be taken by that machine; and combinations thereof.

8. The network node of claim 1, wherein the control unit is further adapted to communicate a device announcement signal to at least one other network node in response to the control unit changing the configuration that the network node operates in from an end-node configuration to a router configuration.

9. The method of claim 1, wherein the frequency or number of power cycles experienced by the network node is determined by sensor monitoring of at least one wall switch that supplies power to the network node.

10. A method of controlling a network node for a mesh network comprising:
   determining, in the network node, an indicator of reliability of the network node, wherein generating the indicator of reliability of the network node comprises determining the indicator of reliability of the network node based on a frequency or number of power cycles experienced by the network node; and
   configuring by the network node, whether the network node is to operate in either a router configuration or an end-node configuration based on the determined indicator of reliability of the network node.

11. The method of claim 10, wherein the step of configuring the network node comprises:
   configuring the network node to operate in the end-node configuration if the generated indicator of reliability of the network node is below a predetermined level.

12. The method of claim 10, further comprising the step of:
   communicating a device announcement signal from the network node to at least one other network node in response to changing the configuration that the network node operates in.

13. The method of claim 10, further comprising the step of:
   periodically reconfiguring the network node between the router configuration and the end-node configuration.

14. A non-transitory computer program product comprising computer program code means adapted to perform all of the steps of the method of claim 10 when said program is run on a computing device having a processor.

15. The method of claim 10, further comprising the step of:
 communicating a device announcement signal from the network node to at least one other network node in response to changing the configuration that the network node operates in from an end-node configuration to a router configuration.

16. The method of claim 10, wherein the indicator of reliability of the network node is selected from the group consisting of:
 a numerical measure;
 a score; and
 an alphanumeric description.

17. The method of claim 10, wherein the indicator of reliability of the network node is compared against a predetermined threshold.

18. The method of claim 10, wherein the frequency or number of power cycles experienced by the network node is determined by monitoring at least one wall switch that supplies power to the network node.

\* \* \* \* \*